(No Model.) 2 Sheets—Sheet 1.
A. J. JOHNSON.
COMBINED PLANTER AND FERTILIZER DISTRIBUTER.
No. 564,520. Patented July 21, 1896.
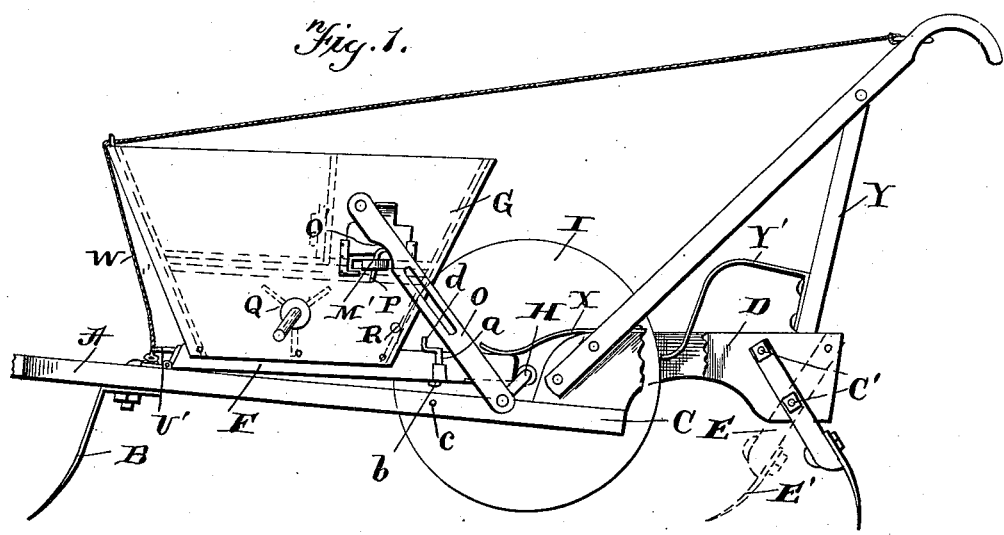
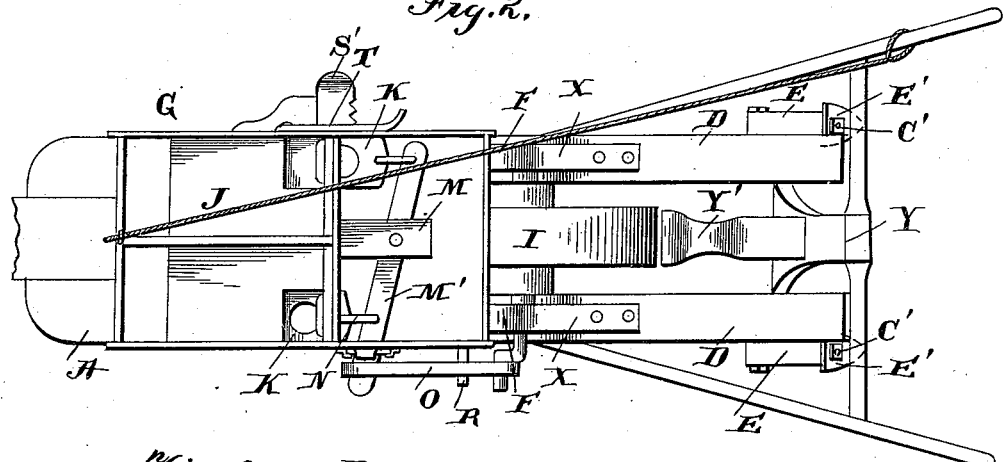
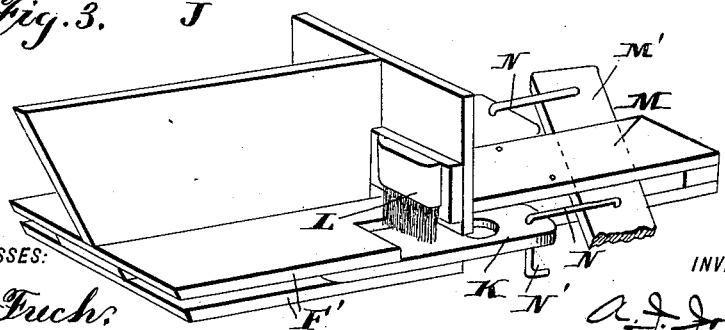
WITNESSES: INVENTOR
ATTORNEYS

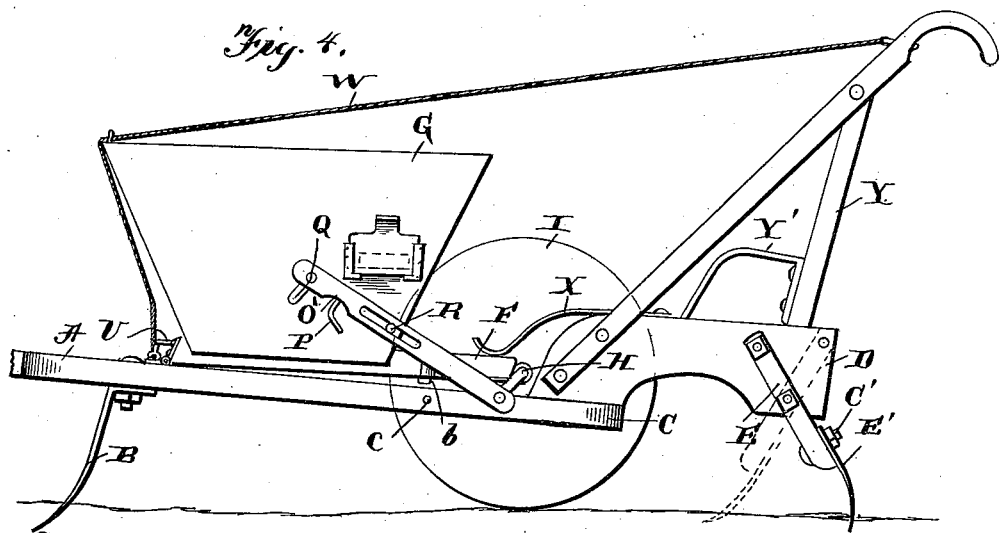
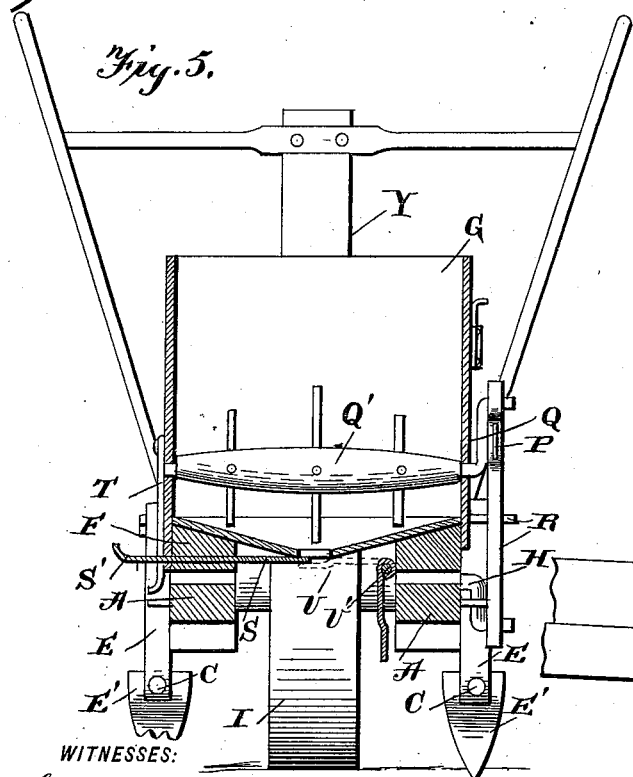
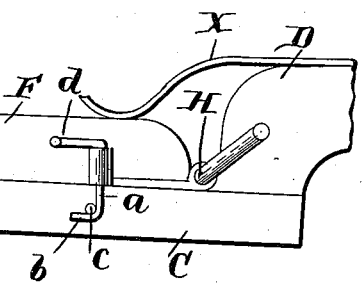

UNITED STATES PATENT OFFICE.

ANDREW JACKSON JOHNSON, OF ETHEL, MISSISSIPPI.

COMBINED PLANTER AND FERTILIZER-DISTRIBUTER.

SPECIFICATION forming part of Letters Patent No. 564,520, dated July 21, 1896.

Application filed April 8, 1896. Serial No. 586,732. (No model.)

*To all whom it may concern:*

Be it known that I, ANDREW JACKSON JOHNSON, of Ethel, in the county of Attala and State of Mississippi, have invented certain new and useful Improvements in a Combined Planter and Fertilizer-Distributer; and I do hereby declare the following to be a full, clear, and exact description of the invention, such as will enable others skilled in the art to which it pertains to make and use it, reference being had to the accompanying drawings, which form part of this specification.

The invention pertains to combined planters and fertilizer-distributers; and its object is to provide an improved machine of simple construction adapted for use either as a planter or fertilizer-distributer.

The invention consists in the novel features of construction hereinafter fully described and claimed, and illustrated by the accompanying drawings, in which—

Figure 1 is a side elevation of my improved machine when used as a seed-planter. Fig. 2 is a plan view of the same. Fig. 3 is a detail perspective view of the removable seed-boxes adapted to fit within the hopper. Fig. 4 is a side elevation of the machine when used as a cotton-seed planter as well as a fertilizer-distributer. Fig. 5 is a cross-sectional view through the hopper of the construction shown in Fig. 4. Fig. 6 is an elevation of a portion of the machine, showing the hopper-base secured to the main frame of the machine, as when the same is to be moved to or from the place of planting.

A designates the forward portion of the main frame of the machine, and depending therefrom is the furrow-opener B. Raised from the rear end of frame C is the rear frame portion D, and secured to opposite sides thereof are the seed-coverers or furrow-closers E, having the usual shovels E'. Each furrow-closer is secured to frame D by two bolts C', and the same is adjustable on the lower bolt, so as to occupy the position indicated in solid lines in Fig. 1, wherein the shovel has a backward inclination, or it may be turned upon the said lower bolt, as shown in dotted lines, and the shovel thereby given a forward inclination, as may be desired by the operator.

Hinged at its forward end to the forward portion of frame A is the backwardly-extending auxiliary frame F, supporting hopper G. Journaled upon crank-shaft H in the rear end of this auxiliary frame F is the operating-wheel I. Adapted to fit within the hopper is the removable partitioned seed-container J, the same having at its forward end and upon opposite sides the vertically-perforated seed-slides K, working beneath brushes L, whereby the seed is drawn from the container and dropped into the hopper-bottom. This removable container F is preferably formed with the double bottom F', the two bottoms being slightly separated to form guideways for the seed-slides, whereby their movement is made certain. Thus corn and peas or beans may be planted or dropped at the same time by means of this arrangement, each kind of seed having its own containing-compartment from which it is fed with regularity to be dropped.

The container J carries the rearwardly-projecting portion M, and pivotally secured between its ends thereto is lever M', having one end projected through an opening in the hopper. Hooks N connect the slides, with said lever and by the arrangement here shown are alternately projected thereby as the lever is vibrated. Hooks N have depending ends N' where joined to the seed-slides, with the extremities of said depending ends turned to an angle, and the hooks are thereby held from becoming displaced when the parts are disconnected. For vibrating lever M' the bar O is provided, said bar at its lower end being secured to the crank of shaft H, while near its opposite end it is recessed upon one edge, as indicated at O', and provided with the depending curved hooks P, which engage the projected end of lever M', and hence as the shaft is rotated by the revolving of the wheel upon the ground the said lever is oscillated and the seed-slides reciprocated, as will be understood.

When operating as a cotton-seed planter or fertilizer-distributer, the seed-container J is removed from the hopper, lever M' and bar O having been first disconnected, and the said bar is secured to the crank of shaft Q, extended transversely through the hopper, and which carries the agitator Q'. Bar O is slotted longitudinally between its ends and works on stud R, projected from hopper, and by this means rotary movement is transferred to the agitator-shaft from crank-shaft H. The size of the opening in the bottom of the hopper through which the fertilizer is discharged is controlled by the transversely-movable slide S, having its projecting arm S' formed with notches adapted to be engaged by the spring T on the side of the hopper, and by this means the slide is held at the desired position. A downwardly-swinging cut-off U on rod U' may be turned upward for closing the discharge-opening entirely when desired. Rod U' is formed with a crank at its end and may be conveniently operated by a cord W, leading upward over the front of the machine and backward to within reach of the operator.

Projecting forward from the frame D are spring-arms X, the same being bowed downward at their extremities to bear upon the rear end of hopper-carrying frame F, and by this means the said frame is held normally pressed upon the main frame A, with the operating-wheel in a lowered position, so as to bear upon the ground. This downward pressure tends to hold the wheel in engagement with the ground, however irregular its surface, and thus insure continuous operation of the mechanism within the hopper. The handle-post Y, besides supporting the handles, sustains the spring-scraper Y', curved forward to the periphery of the operating-wheel for the purpose of keeping it clean. For the purpose of moving the machine, either before or after planting or distributing, it is desirable to secure the operating-wheel positively in position, so that the machine may be supported thereon and transported thereby. For this purpose I provide the rods a, which are secured to opposite sides of frame F and which are hooked at their lower ends, as indicated at b, to engage studs c, projected from main frame A. The engagement of these parts is shown in Fig. 6, and when thus arranged the machine is adapted to be moved from place to place either before or after the machine has been operated.

When the machine is in operation and it is desired that the hopper-frame have the vibratory movement, the rods a are released from the studs and raised, so that their bent upper ends d may be turned over the top surface of frame F and thus held raised above studs c, as in Fig. 1, and thus entirely out of the position where they might accidentally engage said studs when the planter is in use.

Having thus fully described my invention, what I claim, and desire to secure by Letters Patent, is—

1. The combination of the main frame, the auxiliary hopper-carrying frame adapted to vibrate on the main frame, a dropping mechanism, the operating-wheel journaled to the vibratory frame and adapted to operate the dropping mechanism, and springs adapted to hold the vibratory and main frames normally together, substantially as shown and described.

2. The combination of the main frame, the vibratory frame thereon, the hopper on said frame, a dropping mechanism, the operating-wheel journaled to the vibratory frame and adapted to operate the dropping mechanism, the rear portion of the main frame being raised above the normal plane of the vibratory frame, and the spring-arms projected forward from the said raised portion of the main frame adapted to bear upon the vibratory frame and thus hold the same normally depressed upon the main frame, substantially as shown and described.

3. The combination of lever M', seed-slide K, and link N having a short hook at one end to engage the lever and at its opposite end having an elongated angular part N' depending through the slide, for the purpose substantially as shown and described.

4. The combination of a frame, a crank-shaft, an operating-wheel thereon, seed-dropping mechanism, an operating-lever for said mechanism requiring vibration, and bar O secured at one end to the crank-shaft and adjacent its opposite end provided with a depending hook adapted to engage said lever, substantially as shown and described.

5. The combination of a frame, a crank-shaft, an operating-wheel thereon, seed-dropping mechanism, an operating-lever therefor requiring vibration, arm O secured at one end to the crank-shaft and at a point adjacent its opposite end recessed, and the curved hook depending from said recessed part to engage said lever, substantially as shown and described.

6. The combination of the main frame, the vibratory frame, the operating-wheel journaled to the vibratory frame, studs projected from the main frame, vertically-movable rods hooked at their lower ends to engage the said studs when the frames are to be made rigid, said rods being bent at their upper ends and adapted to be turned inward in engagement with the vibratory frame when the rods are to be held out of engagement with said studs, substantially as shown and described.

In testimony whereof I affix my signature in presence of two witnesses.

ANDREW JACKSON JOHNSON.

Witnesses:
N. N. SWEAT,
L. H. HOLLINGSWORTH.